Figure 1:
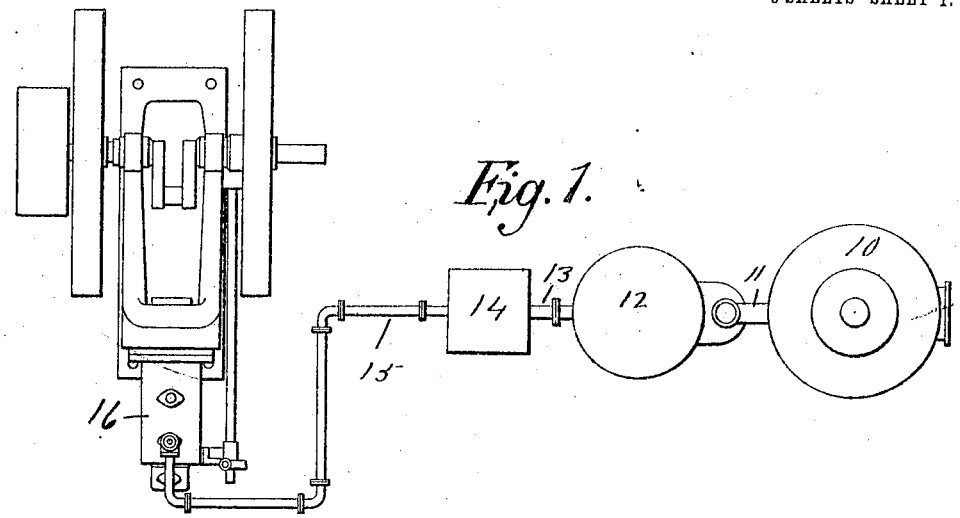

No. 877,044. PATENTED JAN. 21, 1908.
H. W. BRADLEY.
CONTROLLING MEANS FOR GAS ENGINES.
APPLICATION FILED JUNE 20, 1904.

6 SHEETS—SHEET 1.

Attest
C. S. Middleton
L. B. Middleton

Inventor
Henry W. Bradley
by Spear, Middleton, Donaldson & Spear
Attys.

No. 877,044. PATENTED JAN. 21, 1908.
H. W. BRADLEY.
CONTROLLING MEANS FOR GAS ENGINES.
APPLICATION FILED JUNE 20, 1904.

6 SHEETS—SHEET 2.

No. 877,044.

PATENTED JAN. 21, 1908.

H. W. BRADLEY.
CONTROLLING MEANS FOR GAS ENGINES.
APPLICATION FILED JUNE 20, 1904.

6 SHEETS—SHEET 4.

No. 877,044. PATENTED JAN. 21, 1908.
H. W. BRADLEY.
CONTROLLING MEANS FOR GAS ENGINES.
APPLICATION FILED JUNE 20, 1904.

6 SHEETS—SHEET 5.

Attest
R. E. Ourand.
L. B. Middleton.

Inventor
Henry W. Bradley
by Spear, Middleton, Donaldson & Spear
Attys

No. 877,044. PATENTED JAN. 21, 1908.
H. W. BRADLEY.
CONTROLLING MEANS FOR GAS ENGINES.
APPLICATION FILED JUNE 20, 1904.

6 SHEETS—SHEET 6.

Attest
C. S. Middleton
L. B. Middleton

Inventor
Henry W. Bradley
by Spear, Middleton, Donaldson & Spear
Attys.

UNITED STATES PATENT OFFICE.

HENRY WENTWORTH BRADLEY, OF ASHTON-UNDER-LYNE, ENGLAND.

CONTROLLING MEANS FOR GAS-ENGINES.

No. 877,044.     Specification of Letters Patent.     Patented Jan. 21, 1908.

Application filed June 20, 1904. Serial No. 213,364.

*To all whom it may concern:*

Be it known that I, HENRY WENTWORTH BRADLEY, a subject of the King of Great Britain and Ireland, and residing at Wellington Works, Ashton-under-Lyne, in the county of Lancaster, England, have invented certain new and useful Improvements in the Controlling Means for Gas-Engines, of which the following is a specification.

My invention relates to gas engines operating with suction gas producers, and my object is to so control or govern the gas engine that, notwithstanding great and rapid variations of load, the suction producer is always kept in a sufficiently active state at light loads, as to immediately respond to the increased consumption of gas required at heavy loads.

My object, also is to provided an attachment to gas engine governors which permits the governor to be arranged for rapidly varying loads or for slowly varying loads.

In suction gas producers at present in use, the movement of the gas engine piston draws gas from a suction gas producer and air from the atmosphere. When the engine is working at full load the whole mass of fuel in the producer is incandescent. If an engine, however, works for a considerable period of time at a light load, then a smaller mass of fuel in the producer becomes incandescent, and any sudden increase in the air drawn through the producer to meet an increase of load results in deterioration of the gas supply. Where great variations of load occur, I have found that it is necessary to draw a certain minimum quantity of air through the producer.

My invention consists broadly in causing the engine to always draw gas from the producer at least at a minimum rate, this minimum rate being such as will maintain a sufficient incandescent zone in the producer ready to meet sudden increases of load.

The invention consists more specifically in governing a suction producer gas engine by the usual method of throttling the gas supply up till the point when a certain minimum charge of gas is reached after which further governing is effected by retarding the ignition, whereby the minimum amount of air required to maintain a sufficiently incandescent zone in the producer is always sucked through by the engine.

The invention also consists in the suction producer gas engine governing devices hereinafter described.

Figure 6:
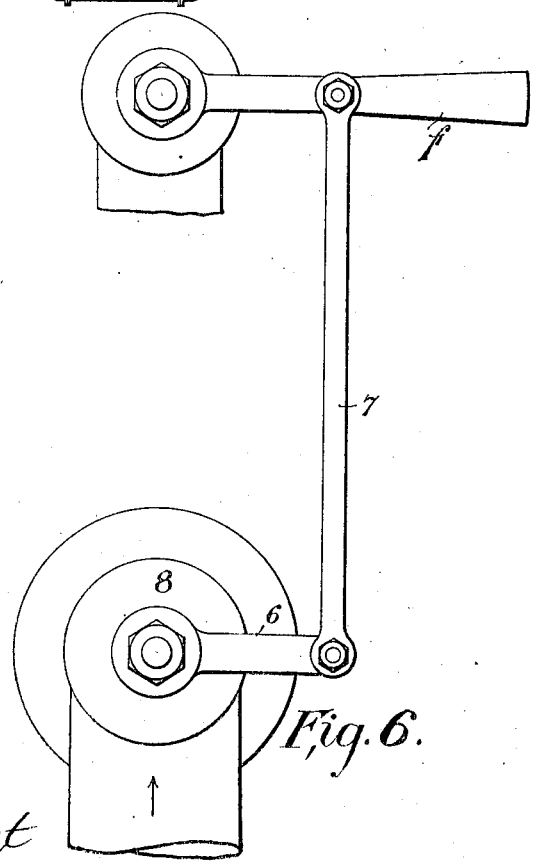
Figure 2:
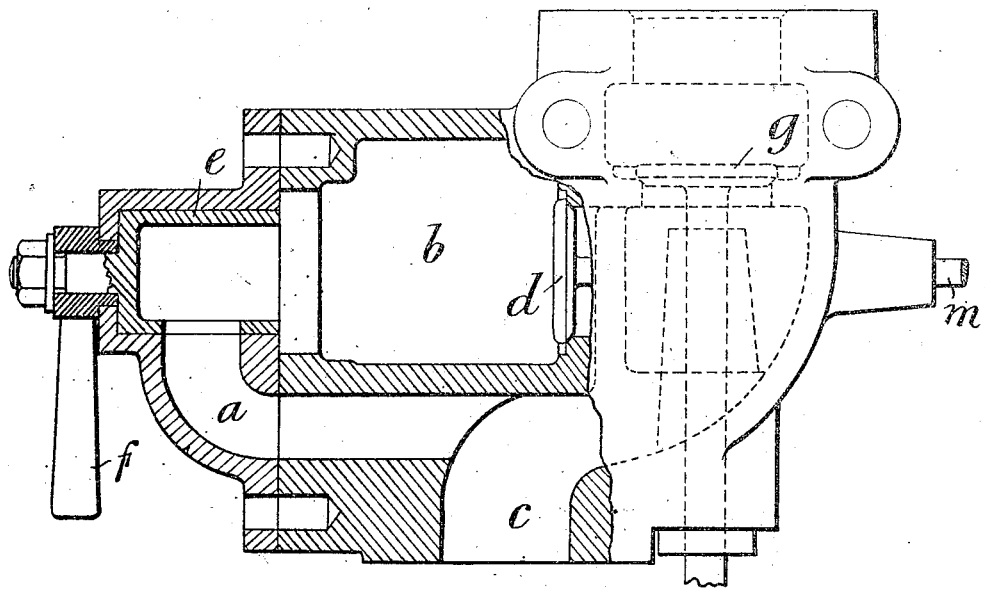
Figure 3:
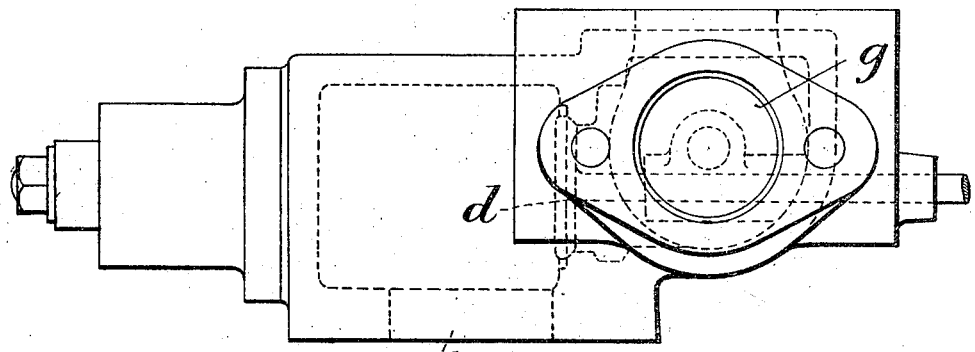
Figure 4:
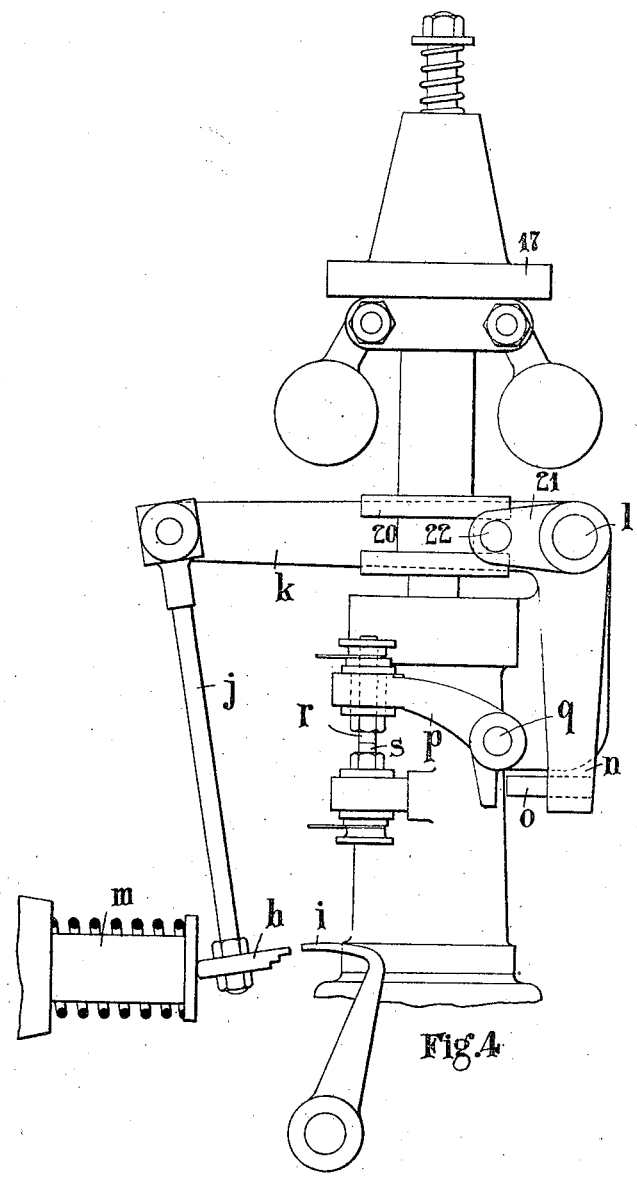
Figure 5:
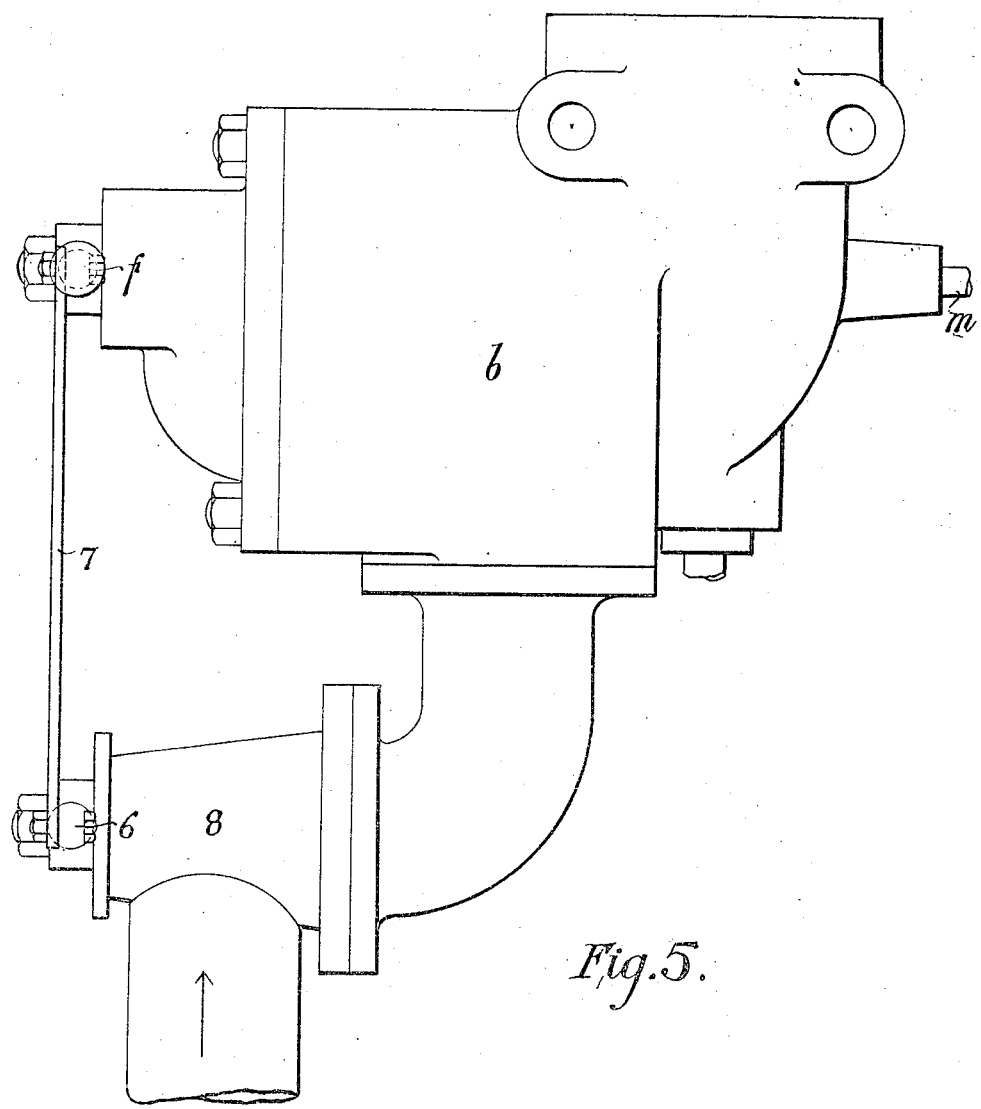
Figure 7:
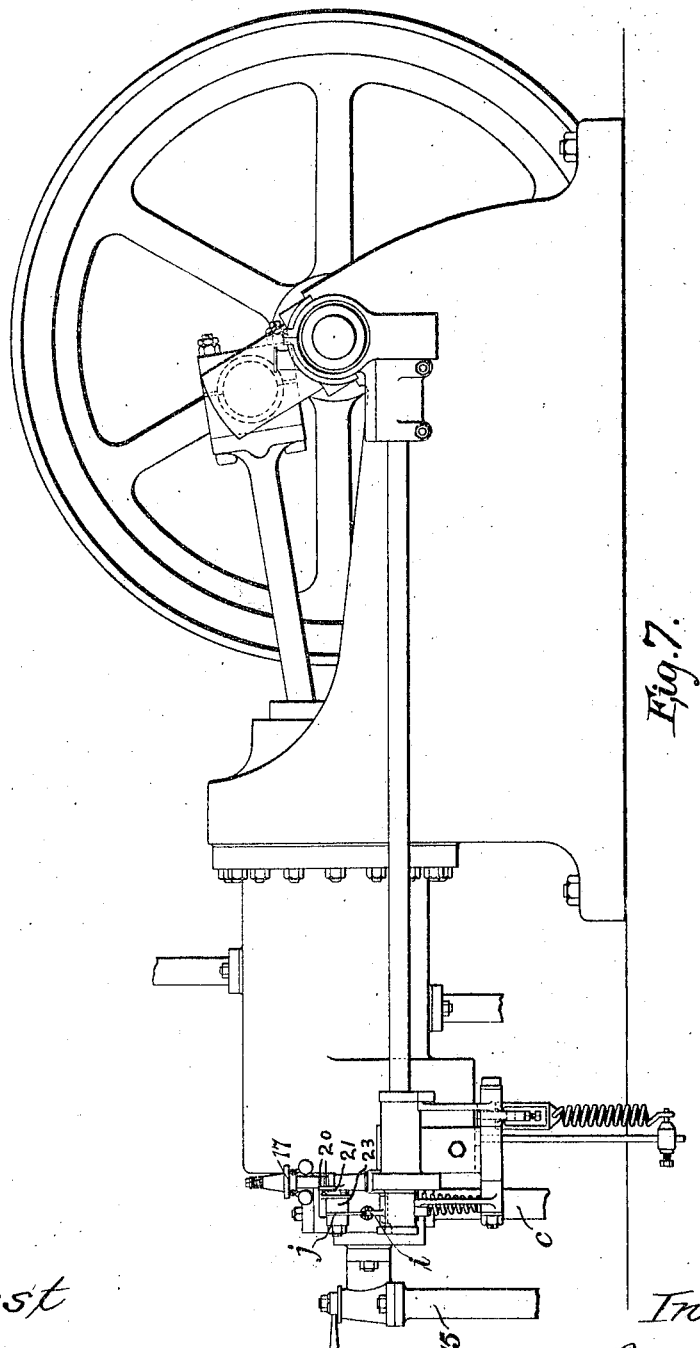
Figure 8:
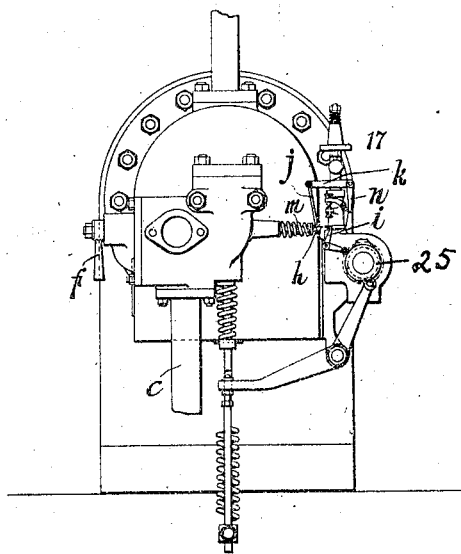

Referring now to the accompanying drawings, Figure 1 is a diagrammatic view showing an arrangement of suction gas producer and engine, the engine being provided with a by-pass according to the invention, Figs. 2 and 3 are enlarged details showing the arrangement of the gas and air passages, Fig. 2 being a part sectional elevation while Fig. 3 is a plan. Fig. 4 is a detail view of the governor gear employed when the charge is ignited by an electric spark. Figs. 5 and 6 are detail views of the hand controlling gear employed for adjusting the charge drawn into the engine at light loads. Figs. 7 and 8 show a side view and an end view respectively of an engine with the present invention applied. in one form; in Fig. 8 the gas supply pipe, 15, and the usual controlling cock have for the purpose of simplification been omitted, these however, are clearly seen in Fig. 7.

In carrying the invention into effect according to one form the plant is arranged in the manner diagrammatically shown in Fig. 1. Gas is produced in the chamber 10 and is drawn by the piston of the engine 16, at its suction stroke, through the pipe 11, coke scrubber 12, pipe 13, and sawdust scrubber 14 and so by the pipe 15 to the gas chamber $b$ of the engine 16 (Figs. 2 and 3). Here the gas joins with air drawn through a passage $c$ and the mixture passes through a spring-controlled valve $g$ into the engine cylinder where the usual four stroke cycle of operations is carried out.

In order to maintain a sufficiently incandescent zone in the producer, a continually open by-pass $a$ is provided leading from the chamber $b$ to the inlet passage $c$. At right angles to the plane of the inlet valve $g$ which is operated by a cam 25, (see Fig. 9) there is arranged the main gas inlet valve $d$ opening into the chamber $b$ and controlling the main outlet from this chamber to the inlet supply passage $c$. The by-pass $a$ is under the control of a cock $e$ operated by a handle $f$ which in some cases is also connected by a rod 7 (Figs. 5 and 6) with a cock 8 operated by a handle 6 and arranged to control the supply of air drawn in through the passage $c$, the by-pass valve being arranged to open as the air valve closes whereby the quantity of air drawn through the producer may be effectively controlled to meet requirements.

The lift of the main gas valve $d$ is controlled by the governor 17 through the gear illustrated in enlarged detail in Fig. 4. A stepped die-piece $h$ resting against the end of the gas valve spindle $m$ and under the control of the centrifugal governor 17, coöperates with a pecker $i$ to vary the extent of opening of the gas valve $d$. A rod $j$ connects the die piece $h$ to an oscillating lever $k$ pivoted about the point $l$ and operatively connected to the sliding sleeve of the governor. Thus the pivot $l$ is provided with a crank 21 having a pin 22 engaging between two collars 20 on the governor sleeve which is moved in the well known manner by the rotating governor balls. On the pivot $l$ which is supported by a bracket 23 there is also mounted a lever $n$ carrying at its end a pin $o$ which when the governor has moved the oscillating arm $k$ through a certain distance, presses against a tail piece on a lever $p$ pivoted about the point $q$. This lever carries at its end a contact $r$ which normally engages with a fixed contact $s$. These contacts are in the igniting circuit so that by moving the contact $r$ the circuit is broken and the ignition in consequence stopped or retarded. This does not occur, however, until after the governor has moved the stepped die piece $h$ out of the path of the pecker $i$.

The operation of this governing device is as follows. Under normal full load the pecker $i$ strikes the highest step in the die piece $h$ during each charging stroke of the engine. Gas is thus drawn from the producer as described above through the pipe 15 while air is drawn in through the pipe $c$, (Figs. 8 and 9). When the load falls the governor raises the die piece till a lower step on the die piece $h$ engages with the pecker $i$ and consequently a smaller opening and one of shorter duration is given to the gas valve $d$, or if the fall in load is considerable the die piece $h$ may be moved quite out of the path of the pecker $i$. In consequence of this the gas valve $d$ does not receive any opening, but nevertheless gas is drawn from the gas chamber $b$ into the cylinder through the by-pass $a$. If the engine is to be running for some time under light load the mixture so drawn in may be arranged to be a combustible one by suitably proportioning the openings of the cocks $e$ and 8. In some cases also the cock 8 may be omitted as shown in Figs. 8 and 9 and the proportioning of the mixture drawn in at light loads may be effected only by the gas cock $e$. It will be understood that during the time that governing is being effected as described above the pin $o$ has not been brought to bear on the tail piece of the lever $p$ and in consequence the ignition has been taking place in the usual way. If now the load on the engine falls still further, the lever $k$ rises sufficiently under the action of the governor to cause the lever $n$ to carry the pin $o$ against the tail piece of the lever $p$. In this way the igniting circuit is broken and the ignition stopped or retarded according as the governor acts.

By this device the incandescent zone in the producer is maintained without limiting the operation of the engine governor and thus the engine may readily respond to increased demands for power since no loss of time occurs owing to the activity of the producer having to be brought to the required degree from a very low state before the gas drawn into the engine is of the required richness.

It will be understood that the governor pecker may be arranged to act on the charge valve $g$ in the manner described with reference to the gas valve $d$. In this case, however, the by-pass leads direct into the combustion chamber and is provided with an automatic non-return valve. Further although I have described my invention as applied to a gas engine having an electric ignition it may be employed in conjunction with any form of suction gas engine and I wish it to be understood that I do not limit myself to the details hereinbefore described and shown on the drawings.

Having now described my invention, what I claim as new and desire to secure by Letters Patent is:—

1. In combination with an internal combustion engine and a suction gas producer, a gas inlet valve for the engine and a continually open by-pass leading from the producer to the engine past the gas inlet valve, through which by-pass a minimum quantity of gas is drawn to maintain an incandescent zone in the producer.

2. A gas engine working with suction gas plant having a valve controlled gas inlet passage to the working cylinder and a continually open by-pass leading from said passage to said cylinder, substantially as described.

3. A suction gas engine having a valve controlled gas inlet passage to the working cylinder, a valve controlled charge inlet passage into which said gas passage leads, a continually open by-pass from said gas passage to said charge passage, substantially as described.

4. A suction gas engine having a charge inlet passage to the working cylinder, a gas supply passage leading thereto, a valve controlling the opening of said gas passage to the charge passage, governor control means for said valve, a continually open by-pass from said passage to said charge inlet passage, substantially as described.

5. A suction gas engine having a valve controlled gas inlet passage and a continually open by-pass from said gas inlet to the working cylinder, governing means for controlling the opening of the gas valve, until at higher speeds the opening of said gas valve becomes $nil$, means for controlling the ignition, said means being connected to the governor and coming into operation only at higher speeds than that required to effect the reduction of the gas valve opening to *nil*, substantially as and for the purposes hereinbefore described.

6. A suction gas engine having in combination a charge inlet passage and a valve therefor, a gas inlet passage opening to said charge inlet and a valve for said gas passage, a continually open by-pass leading from said gas passage to said charge passage and a control device for said by-pass, substantially as described.

7. A suction gas engine having in combination with the working cylinder governing means comprising means operating only at normal speeds for throttling admission of working fluid to the cylinder and means operating only at higher speeds for controlling ignition of said working fluid, substantially as described.

8. A suction gas engine having in combination with the working cylinder governing means comprising means operating only at normal speeds for throttling the admission of gas and means operating only at higher speeds for controlling ignition, substantially as described.

9. A suction gas engine having in combination with the working cylinder governing means comprising means operating only at normal speeds for throttling to a certain minimum the admission of working fluid to the cylinder and means operating only at higher speeds for cutting out said ignition, substantially as described.

10. A suction gas engine having a continually open passage between the producer and the engine, a main gas passage and inlet valve therefor, a cam operating said valve, governing means co-acting with said cam for reducing the amount of opening of said gas valve as the speed increases, an ignition device connected to said governing means, said connections being arranged to leave the ignition device unaffected until such speeds are reached that the gas inlet valve opening is *nil* substantially as described.

11. A governor for a suction gas engine having a gas inlet valve, a pecker $i$ for operating said valve, a step piece $h$ for transmitting the motion of the pecker to the valve, connection between said step piece $h$ and the governor for regulating the opening of the valve, a contact carried by a pivoted lever $p$, a pin $o$ operated by the governor and adapted to move said contact after the step piece $h$ has been moved into a position in which it does not co-act with the pecker $i$, substantially as described.

12. A gas engine working with suction gas plant having in combination with the working cylinder, a valve controlled gas passage to the working cylinder, a continually open by-pass leading from said passage to said cylinder and means for controlling the opening of said by-pass, substantially as and for the purpose described.

13. A suction gas engine having in conjunction with the working cylinder, governing means comprising means operating only at normal and low speeds for throttling to a certain minimum the admission of gas to the cylinder and means operating only at higher speeds for controlling the ignition, substantially as described.

14. A suction gas engine having in conjunction with the working cylinder, a gas passage to said cylinder, a mechanically operated valve controlling said passage, an additional continually open gas passage to said cylinder, hand controlled means for adjusting the opening of said additional passage.

In witness whereof I have hereunto set my hand in presence of two witnesses.

HENRY WENTWORTH BRADLEY.

Witnesses:
ROBERT MORRISON NEILSON,
VIVIAN ARTHUR HUGHES.